UNITED STATES PATENT OFFICE.

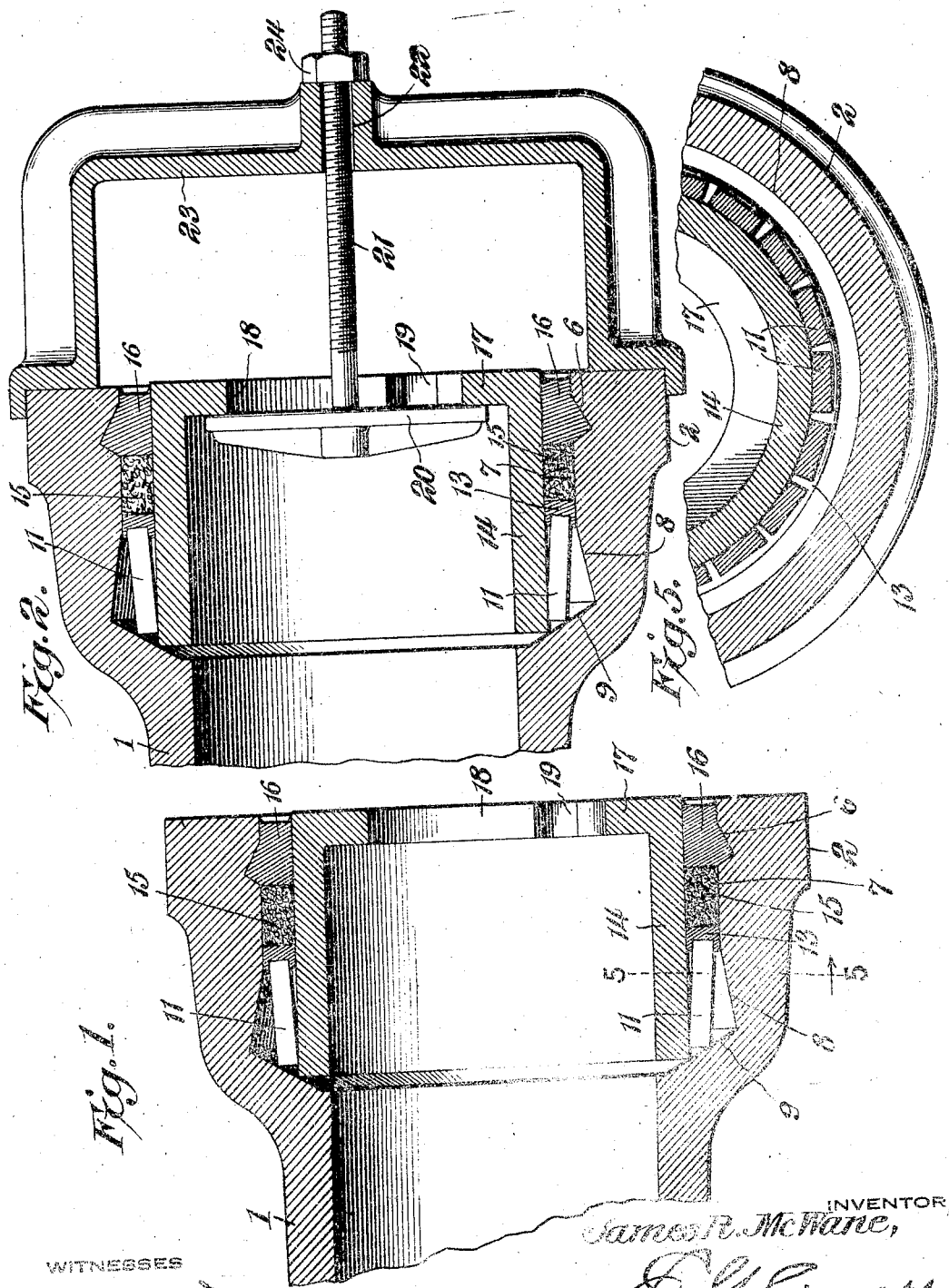

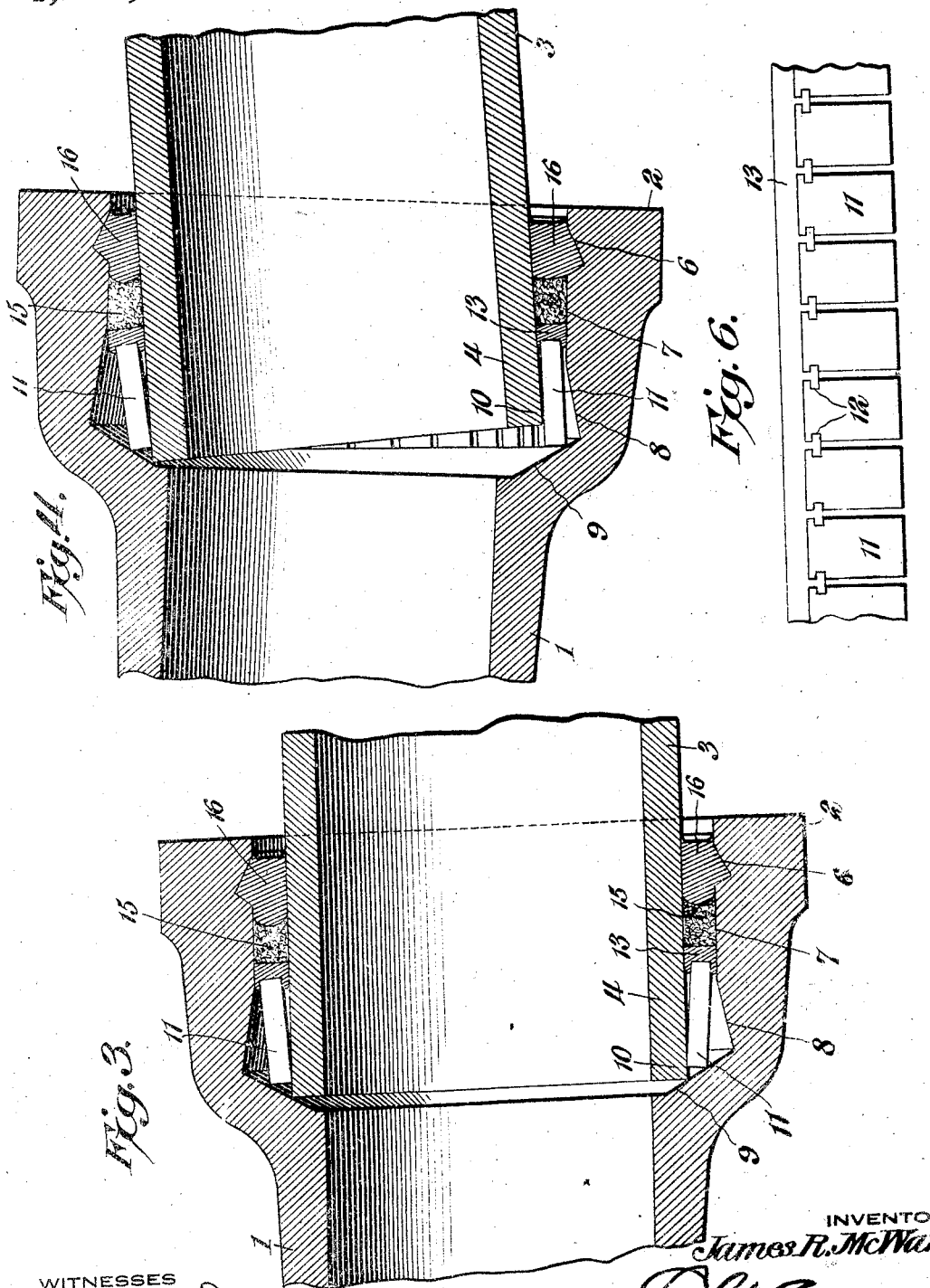

JAMES R. McWANE, OF BIRMINGHAM, ALABAMA.

PIPE-JOINT.

1,288,092.  Specification of Letters Patent.  Patented Dec. 17, 1918.

Application filed April 18, 1918. Serial No. 229,402.

*To all whom it may concern:*

Be it known that I, JAMES R. McWANE, a citizen of the United States, residing at Birmingham, in the county of Jefferson and State of Alabama, have invented a new and useful Pipe-Joint, of which the following is a specification.

This invention has reference to pipe joints of either bell and spigot type or of the collar or sleeve type, and the invention is an improvement upon the pipe joint shown, described and claimed in my application No. 200,902, for a pipe joint, filed Nov. 8, 1917.

The pipe joint of the said application is a prepared joint and is intended to withstand considerable deflection between adjacent lengths of pipe without the liability of leakage, and it is the object of this invention to retain all the advantages of the pipe joint of said application and at the same time add to such advantages by making the joint more positive.

The invention has to do with the arrangement of the devices and materials making up the packing of the joint and may utilize the same structure of metal blocks and lead packing disclosed in the aforesaid application, but in accordance with this invention a fibrous material, such as jute, is interposed between the blocks and the lead packing so that the jute may be effectively compressed by the calking of the lead in the bell about the spigot member introduced therein, such spigot member under certain circumstances, having a plain sleeve temporarily substituted therefor to be afterward replaced by the spigot end of the pipe.

For reasons which will hereinafter appear, the presence of the jute in the particular location contemplated by this invention is highly advantageous, especially where the joint of the aforesaid application might be liable to leak under the same conditions of use.

The invention will be best understood from the consideration of the following detailed description, taken in connection with the accompanying drawings which form a part of this specification, with the further understanding that, while the drawings show a particular form of the invention, the latter is not confined to any strict conformity with the showing of the drawings but may be changed or modified so long as such changes or modifications come within the scope of the appended claims.

In the drawings:

Figure 1 is a longitudinal diametric section of the packed bell end of the pipe with a temporarily located plug or former therein.

Fig. 2 is a view similar to Fig. 1 but showing a puller device in position to withdraw the plug.

Fig. 3 is a view similar to Fig. 1 but showing the spigot end of a pipe in the bell end and the lead calked into final position.

Fig. 4 is a view similar to Fig. 3 but showing the spigot end of the joint deflected with respect to the bell end.

Fig. 5 is a section on the line 5—5 of Fig. 1.

Fig. 6 is a plan view of a portion of the connected series of metal filler blocks used in the joint.

Since the sleeve type of joint is, so far as the joint itself is concerned, but a duplication at the opposite ends of the bell end of a bell and spigot joint, the expression bell and spigot joint will be employed throughout this specification and in the claims with the understanding that it is comprehensible enough to apply to both the ordinary bell and spigot joint and the sleeve joint. Also, the invention is particularly adapted to cast iron pipe where bell and spigot joints are customary.

In the drawings there is shown a pipe 1 provided with a bell end 2 and there is also shown in Figs. 3 and 4 another pipe 3 having a spigot end 4.

The bell end 2 corresponds generally to the bell end of standard bell and spigot cast iron pipe, but differs therefrom in some particulars. There is provided the usual lead receiving groove 6 near the mouth of the bell and back of this groove and spaced therefrom by a cylindrical portion 7 is a deeper groove 8 having a wall 9 at the inner end or base of the bell tapering toward the interior of the pipe at an angle which may be or which is approximately 30 degrees more or less.

The inner or spigot end of the pipe 3 has a plain extremity 10, since with the packing arrangement of the invention the usual exterior bead at the spigot end of the pipe is not needed.

There is also provided a series of metal blocks 11 shown separately in Fig. 6 and in cross section in Fig. 5. These blocks may be formed of steel and are usually of rectangular shape, somewhat longer than wide with matching grooves 12 in opposite edges near one end. The grooves or notches 12 constitute anchorages for a lead strip 13 cast onto the blocks, thus holding the blocks together in a series and in slightly spaced relation. The lead strip may be bent into circular shape or may be initially cast into such shape, whereby there is produced a substantially circular series of blocks for introduction into the bell end of the pipe around a plug or former 14 previously placed in the bell. The blocks 11, which constitute filler and anvil blocks are moved to the base of the bell with the lead connecting strip 13 toward the mouth of the bell and the other ends of the blocks engaging the angle wall 9 which wall forms a conical abutment for the blocks.

Following the filler blocks into the bell there is a quantity of jute 15 placed therein and such quantity may be sufficient to fill the space along the cylindrical wall 7 between the lead strip 13 and inner edge of the lead groove 6.

Following the jute is lead 16 which may be poured into the mouth of the bell in sufficient quantity to fill the groove 6 and is then somewhat compacted by calking to hold the plug 14 against accidental displacement in transit.

The joint is designed to be formed in the bell 2 without the presence of the pipe 5, the plug or former 14 being employed. This permits the assembling of all the parts of the joint except the spigot end of the companion pipe, at the shop or factory, thereby avoiding wastage of lead which is always present in the ordinary method of joining bell and spigot pipes, the latter method customarily employing jute at the inner or basic end of the bell and completing the joint by pouring lead onto the jute and ultimately calking it. This results in the expenditure and wastage of a relatively large quantity of lead, which is an expensive material, and the calking fails to properly compress the jute because the large quantity of lead employed prevents the transmission of the calking forces to the jute to thoroughly compact it, since the lead absorbs the larger proportion of such forces.

When the pipe is assembled in the trench, the plug or former 14 is withdrawn leaving the packing in place ready for the insertion of the spigot end 4 of the pipe 3. This may be readily done since the plug 14 may be of slightly greater external diameter than the pipe 3.

In order to remove the plug 14, it is provided with an inwardly directed flange 17 at what constitutes its outer end, leaving a central passage 18. The flange 17 has notches 19 at appropriate points for the introduction of a head 20 of somewhat greater expansion than the diameter of the passage 18, so that the head may be introduced into the spigot and then by a partial turn lodged behind the flange 17. The head 20 is carried by a threaded stem 21 extending through a passage 22 in a puller yoke 23 of a diameter to bear against the outer end of the bell 2. A nut 24 applied to the threaded stem 21 and bearing against the yoke 23 at the outer end of the passage 22 provides a means whereby the plug 14 may be withdrawn from the bell 2, leaving the packing material in place and permitting the introduction of the spigot end 4 of the pipe 3. This being accomplished the lead 16 is tightly calked with the result that it is compacted into the groove 6 and against the jute 15 and encroaches more or less into the jute space. Since the blocks 11 and lead strip 13 resist any movement of the jute farther into the bell, the encroaching of the lead packing 16 into the jute packing space results in the material compacting of the jute, which latter, because of its fibrous nature, will yield and condense in volume and bear tightly against the walls of the bell and spigot ends of the two pipes where the jute is located.

Should the pipe line become deflected for any reason, the pipes 1 and 3 are forced out of alinement at the joint with the result that the extremity 10 of the spigot 4 will move away from the surface 9 on one side and along the surface 9 at the opposite side toward the middle of the pipe. The blocks 11 are constrained to participate in this movement and the lead packing 16 is expanded on one side and compressed on the other side of the pipe 3. Where the lead 16 is compressed it is forced to a greater extent into the jute space, the blocks 11 and lead strip 13 yielding, since this is permitted by the sloping away of the wall 9 toward the interior of the pipe 1. On the other side, however, the blocks 11 now riding along the slope of the wall 9 away from the center of the pipe are forced with the lead strip 13 into the jute space and the lead packing 16 is in turn forced out of the jute space into the part of the pipe occupied by the lead groove 6. This movement tends to maintain the joint tight despite the deflection of the pipes 1 and 3 with relation to each other so that there is no liability of leakage even though the contents of the pipe line be under high pressure.

By placing the jute between the blocks 11, which also collectively serve as an anvil, and the outer lead packing 16, the jute may be put under any desirable degree of compression by the simple expedient of calking the lead, since the lead is directly forced into the jute in calking instead of the forces being dissipated through the relatively large amounts of lead before reaching the jute.

Moreover, when deflection occurs and the sealing is practically all accomplished by the lead only, rough places in the pipe may tend to score the lead, thus producing slow leaks. In the case of jute so arranged as to perform a very material part of the sealing, such scoring does not occur. Furthermore, in the case of liquids, especially water, being transmitted through the pipe, such liquid as reaches the jute will be absorbed to an extent by the latter, thus causing the jute to swell and correspondingly increasing the sealing action.

The invention also has a commercial value, since many customers demand jute-packed joints. The invention, therefore not only possesses the advantages of the joint of the aforesaid application, but provides additional advantages and also meets the demands of a certain class of customers who would not be satisfied with the prior joint structure.

What is claimed is:

1. A prepared self tightening joint suitable for pipe, comprising bell and spigot portions with a series of filler blocks constituting a backing for the sealing material, the bell having a basic portion against which the blocks abut, fibrous packing material lodged against the backing, and sealing lead at the mouth end of the joint in compacting relation to the fibrous packing material.

2. A prepared self tightening joint suitable for pipe, comprising bell and spigot portions, with the basic end of the bell slanting with respect to the length and width of the bell, filler blocks in position to abut the slanting wall and together constitute an anvil, fibrous packing material against the anvil, and lead sealing material at the mouth end of the bell in compacting relation to the fibrous sealing material.

3. A prepared self tightening joint suitable for pipe, comprising bell and spigot portions, with the basic end of the bell presenting a wall at an angle to the length and width of the bell, a series of blocks for location in the bell about the spigot end of the pipe introduced therein and engaging the angle wall and constituting an anvil, and packing comprising fibrous material and lead with the fibrous material interposed between the lead and the anvil.

4. A joint for bell and spigot pipe, comprising filling means located at the basic end of the bell and constituting an anvil, fibrous packing material engaging the anvil, and lead packing between the fibrous packing means and the mouth of the bell in compacting relation to the fibrous packing means.

5. A bell and spigot joint suitable for pipe, comprising a bell having a lead groove near the mouth end, another groove near the basic end of the bell and provided with a conical wall narrowing toward the body of the pipe, with a second groove separated from the first groove by a packing receiving space, filler means associated with the second named groove and reaching to the packing space, fibrous packing lodged in the packing space against the anvil, and lead packing entering the first named groove and directly engaging the fibrous packing.

6. A joint for bell and spigot pipe, comprising filling means constituting an anvil, fibrous packing, engaging the anvil, and lead packing in compacted relation to the fibrous packing.

In testimony, that I claim the foregoing as my own, I have hereunto affixed my signature in the presence of two witnesses.

JAMES R. McWANE.

Witnesses:
JOHN G. KNAPP,
C. H. HILTON.